United States Patent [19]

Yaeger

[11] Patent Number: 4,584,443
[45] Date of Patent: Apr. 22, 1986

[54] CAPTIVE DIGIT INPUT DEVICE

[75] Inventor: Bernard W. Yaeger, Los Angeles, Calif.

[73] Assignee: Honeywell Inc., Minneapolis, Minn.

[21] Appl. No.: 739,787

[22] Filed: May 31, 1985

Related U.S. Application Data

[63] Continuation-in-part of Ser. No. 610,060, May 14, 1984, abandoned.

[51] Int. Cl.⁴ .............................. B41J 5/10; B41J 7/00; G06C 7/00; H01H 25/00
[52] U.S. Cl. ................................... 200/6 A; 200/5 R; 200/52 R; 235/145 R; 340/365 R; 400/479; 400/485
[58] Field of Search ........... 200/5 R, 5 A, 6 A, 52 R, 200/61.45, 154 R, 157, 340, DIG. 2; 400/479, 485, 489, 491.2; 235/145 R; 340/365 R

[56] References Cited

U.S. PATENT DOCUMENTS

| | | | |
|---|---|---|---|
| 3,022,878 | 2/1962 | Seibel et al. | 400/485 X |
| 3,700,835 | 10/1972 | Rackson | 200/52 R |
| 3,700,836 | 10/1972 | Rackson | 200/52 R |
| 3,950,634 | 4/1976 | Speiser | 235/145 R |
| 4,029,915 | 6/1977 | Ojima | 200/5 A X |
| 4,065,650 | 12/1977 | Lou | 200/5 A X |
| 4,131,772 | 12/1978 | Weckenmann et al. | 200/61.54 |
| 4,218,603 | 8/1980 | Satoh | 200/5 A X |
| 4,517,424 | 5/1985 | Kroczynski | 200/5 R X |

FOREIGN PATENT DOCUMENTS

| | | | |
|---|---|---|---|
| 622694 | 9/1978 | U.S.S.R. | 400/479 |
| 851519 | 7/1981 | U.S.S.R. | 200/5 A |

OTHER PUBLICATIONS

Kowalski, D. C.; "Semi-Captive Keyboard", Xerox Disclosure Journal; vol. 1, No. 2, Feb. 1976; p. 85.

Primary Examiner—J. R. Scott
Attorney, Agent, or Firm—George W. Field

[57] ABSTRACT

In a manual digit data input device, including a set of cups configured to captivate the distal phalanges of a human hand; a housing; apparatus resiliently mounting the cups in the housing for mutually orthogonal transverse movements of the cups; and control apparatus actuated in response to movement of the cups.

8 Claims, 9 Drawing Figures

CAPTIVE DIGIT INPUT DEVICE

This application is a continuation-in-part of a previous application Ser. No. 610,060, filed May 14, 1984 now abandoned, and assigned to the assignee of the present application.

FIELD OF THE INVENTION

This invention relates to the field of data input devices for operation by the manual digits of human operators. A typical exemplar of previous such devices is the typewriter keyboard now used to provide alphanumerical inputs for word processors, computers, etc., in response to digital manipulation by a human operator.

BACKGROUND OF THE INVENTION

In known devices of this sort, the various alphanumeric and other symbols to be used are visibly displayed on the tops of keys which are arranged in prescribed order in a matrix of rows of ten or more keys each. The key tops are kept horizontal, and the rows further from the operator are at successively higher levels. The operator's hands are suspended over the matrix or keyboard so that the fingertips rest lightly on a set of "home" keys which are aligned in a central row or tier in the matrix. Keys are operated by downward movement of particular fingers individually in a learned procedure. To operate keys on other rows, the entire hand is moved to learned alternate positions, so that the specified fingers are over intended alternate keys. If the hand is not moved correctly, however, the fingers may not in fact be positioned over the desired alternate keys, so that when a finger is moved, an entry error is caused. Similarly, upon return to the home keys, if the hand motion is slightly in error, the fingers may not be positioned over the home keys in the proper fashion, so that successive entries may also be in error. To verify finger and key relationships, many operators resort to watching their fingers over the keys, so as to assure correct entry. This hand movement to operate other keys and return to the home key position, and this tendency to observe the keys as well as the material to be entered, slow the entry of data or signals into the device.

A similar problem exists with numerical keyboards which consist of ten digital entry keys and function control keys. With these devices, home keys are not used and different keys are frequently operated by the same finger, which is guided visually. The operator must constantly observe the keyboard to assure correct entry. Eye movement between the data to be entered and the digital keyboard, and use of only a few fingers, slow the entry process, and inattention to finger placement causes entry errors.

BRIEF SUMMARY OF THE INVENTION

The present invention comprises an input device in which the ten manual digits of an operator are resiliently captivated, allowing each digit three or four distinguishable motions to cause any of 36 distinguishable switch operations as inputs to a utilization system, while the operator's hands remain in the same position. The digit motions are familiar ones, and can be learned as expeditously as the motions for conventional keyboard operation, while the additional constraint of captivation prevents most of the errors which arise from the conventional procedure, and the operator's visual attention may be directed solely to the material to be entered.

A particular feature of the invention lies in the provision of means for preventing finger motions which would result in two simultaneous inputs to the utilization system.

Various advantages and features of novelty which characterize the invention are pointed out with particularity in the claims annexed hereto and forming a part hereof. However, for a better understanding of the invention, its advantages, and objects attained by its use, reference should be had to the drawing which forms a further part hereof, and to the accompanying descriptive matter, in which there is illustrated and described a preferred embodiment of the invention.

BRIEF DESCRIPTION OF THE DRAWING

In the drawing, in which like reference numerals identify corresponding parts throughout the several views.

DETAILED DESCRIPTION OF THE PREFERRED EMBODIMENTS

Figure 1:
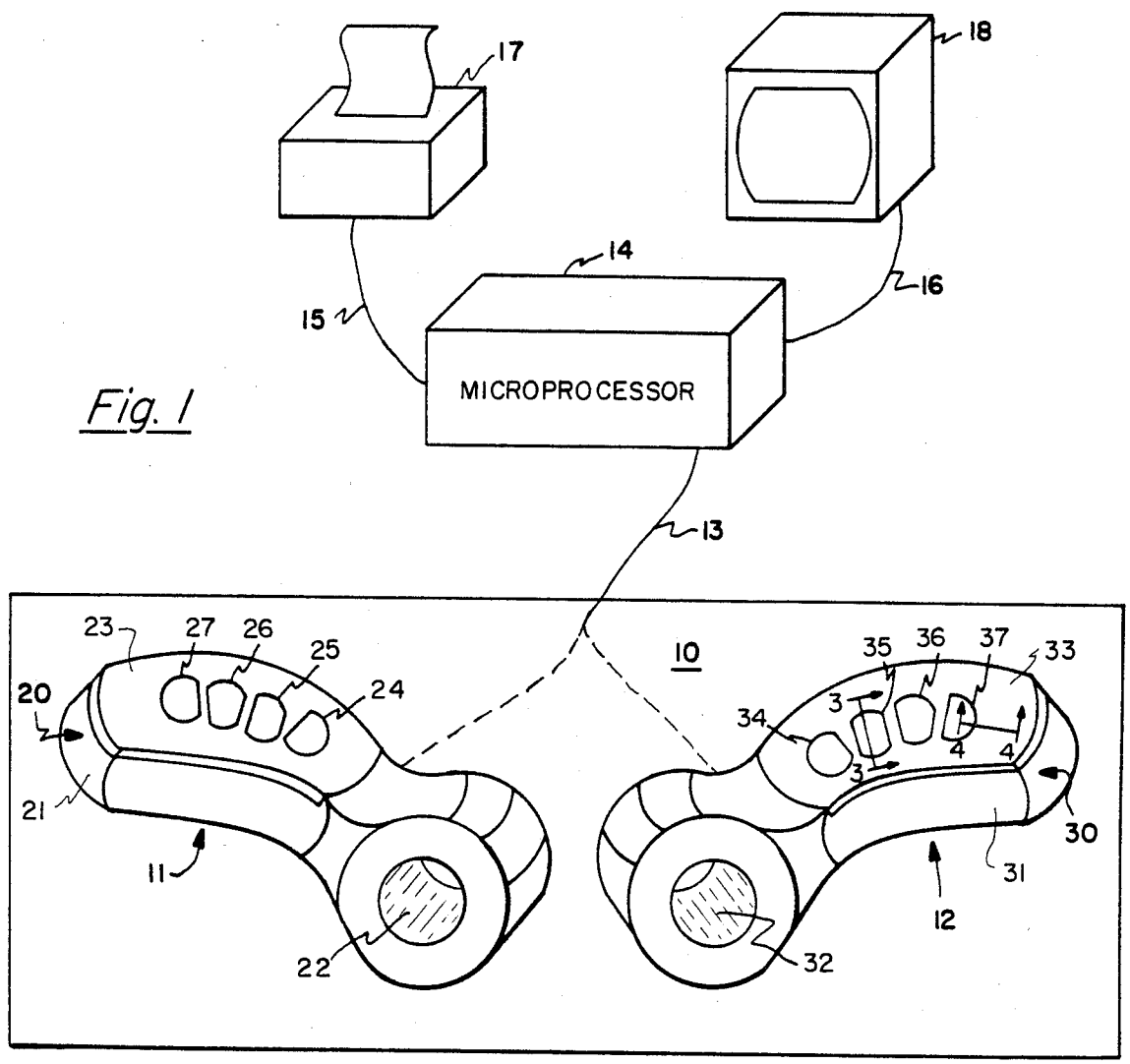
FIG. 1 is a perspective view of apparatus embodying the invention.

In FIG. 1, an input device according to the invention is shown somewhat schematically to comprise a base 10 supporting a left hand unit 11 and a right unit 12. The device is to provide switching signals on a cable 13 to a microprocessor 14, by which they may be converted in well known fashion to alphanumerical and other inputs on a cable 15 and cable 16, to a printer 17 and a display unit 18 respectively.

Unit 11 comprises housing means 20 having a base 21, formed with a thumb hole 22, and a cover 23, formed with an index finger hole 24, a middle finger hole 25, a ring finger hole 26, and a little finger hole 27.

Unit 12 comprises housing means 30 having a base 31, formed with a thumb hole 32, and a cover 33, formed with an index finger hole 34, a middle finger hole 35, a ring finger hole 36, and a little finger hole 37. It will be evident that the axes of the finger holes are generally parallel and vertical, and that the axes of the thumb holes are generally orthogonal thereto.

Because of the considerable variation in dimensions of human hands and fingers, it may be desirable to provide units 11 and 12 in various sizes.

Signals from units 11 and 12 are supplied by the operation of electrical switches. Each of the finger and thumb holes contains a rigid "cup" resiliently mounted in the housing means to enable the selective operation of one of plurality of switches according to the finger or thumb movement of the operator, as will now be described.

Figure 2:
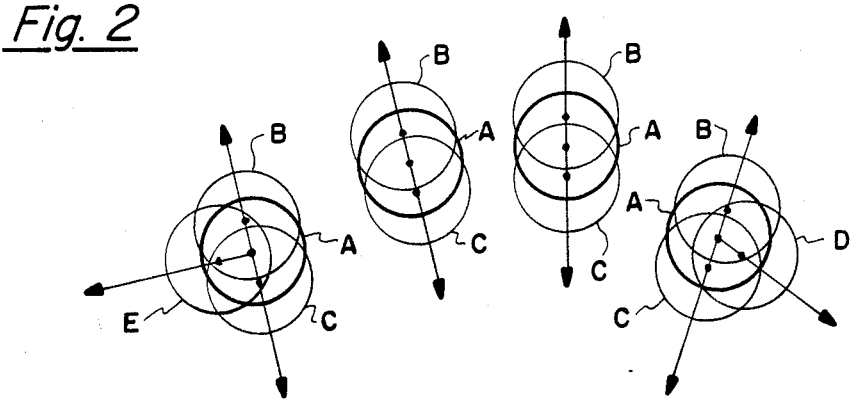
FIG. 2 is a sketch illustrative of the motions of the fingers of an operator's left hand which are enabled and utilized in the invention.

As pointed out above, the invention contemplates "captivating" the operator's digits in the cups from which they are not to be unintentionally removed during operation of the apparatus. The cups are resiliently mounted so that each digit may selectively perform three or four distinguishable functions, rather than the single function performed by each digit on a single key of the usual typewriter, for example. In FIG. 2, the "normal" position of each cup is indicated by the heavy circle A in which axial movement of the digit produces a first function. Alternate functions are obtainable when the cups are moved forward into the positions B, and again when the cups are moved backward into the positions C. The index finger cup can be moved into a further alternate position D, and the little finger cup can be moved into a further alternate position E. By way of illustration the figure shows a cup diameter of 11/16 inches and a movement in each direction of 3/16 inch.

Figure 3:
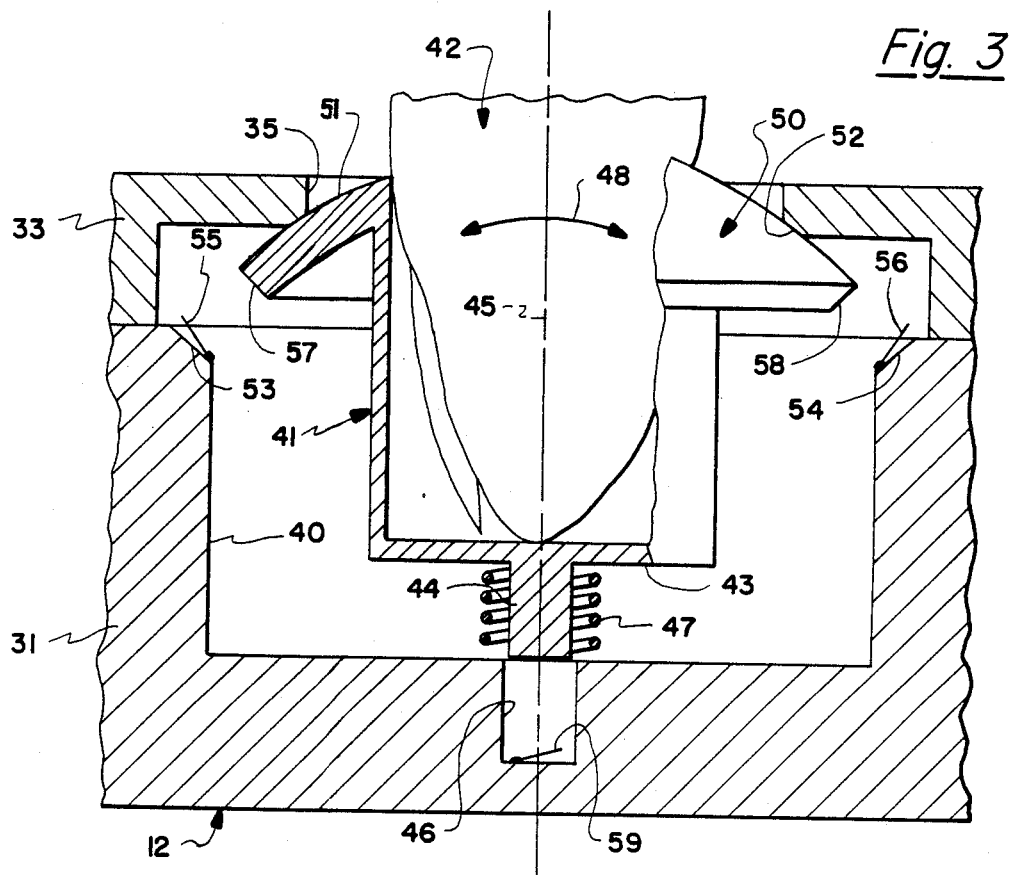
FIG. 3 is a fragmentary sectional view taken along the line 3—3 of FIG. 1.

Attention is now directed to FIG. 3, where housing means 31 is shown to comprise a chamber 40 into which middle finger hole 35 of cover 33 opens. In the chamber there is resiliently mounted a cup 41 to captivate the distal phalanx of the operator's right middle finger, suggested at 42. The bottom 43 of cup 41 is closed, and is provided outwardly with a peg 44 extending along the axis 45 of the cup. Chamber 40 has a socket 46 in its bottom coaxial with peg 44 and sized to receive the peg. The bottom of the cup rests on a compression spring 47 which affords the cup resilient movement along axis 45, and which also enables generally pivotal movement of the cup transverse to the axis, as suggested by the arrow 48.

Cup 41 has a protruding rim 50, the upper surface 51 of which may be of spherical configuration to act as a dust shield against a similar surface 52 the lower rim of hole 35, in the normal and transversely displaced positions of the cup. At sites spaced by 180 degrees around axis 45, housing means 12 has a pair of ledges 53 and 54 on which are mounted electrical switches 55 and 56 respectively, for actuation by surfaces 57 and 58 of cup rim 50 at the extremes of its transverse motion. A further switch 59 is mounted at the bottom of socket 46 for actuation by peg 44 upon axial movement of cup 41. The contacts of switches 53, 54, and 59 are connected to conductors in cable 13.

The structure just described is provided for all the finger holes of both units 11 and 12.

Figure 4:
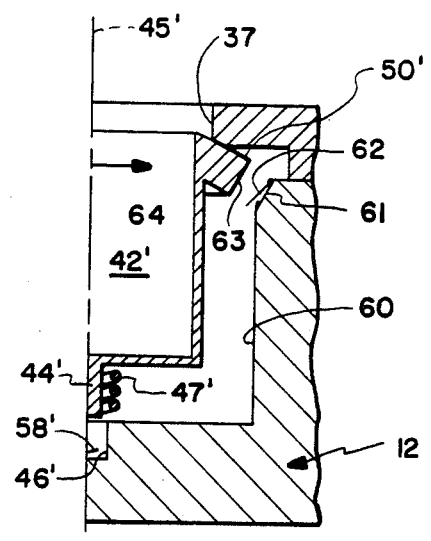
FIG. 4 is a fragmentary sectional view taken along the line 4—4 of FIG. 1.

FIG. 4 shows that the wall of a chamber 60 accessible through little finger hole 37 in cover 33 is provided with a further inward ledge 61 carrying a further switch 62 actuable by a surface 63 of rim 50' angularly equidistant about the axis 45' of the cup 42' from the two switches previously described, for pivotal actuation by sideways movement of the operator's little finger, as suggested by arrow 64. The same extra structure is provided for index finger hole 34, the new available motion being in the opposite direction from that shown in FIG. 4. Thus holes 35 and 36 enable three switching functions, and holes 33 and 37 enable four switching functions. The same arrangement is provided in essentially mirror image fashion for unit 11, so that from finger movements of both the operator's hands there are possible 28 different switch actions.

Inspection of FIG. 3 will make it clear that upon axial movement of the cup to compress its spring, peg 44 enters socket 46 and prevents any transverse movement of the cup, while upon transverse movement of the cup, peg 44 moves out of alignment with socket 46, and prevents axial cup movement. The drawing shows the transverse movement of the cup to be preferably a tilting motion, but will be readily apparent that a sliding motion is also possible. Switches 54, 55, etc. are spaced around rim 50 sufficiently to prevent any two of them from being closed at the same time.

Figure 5:
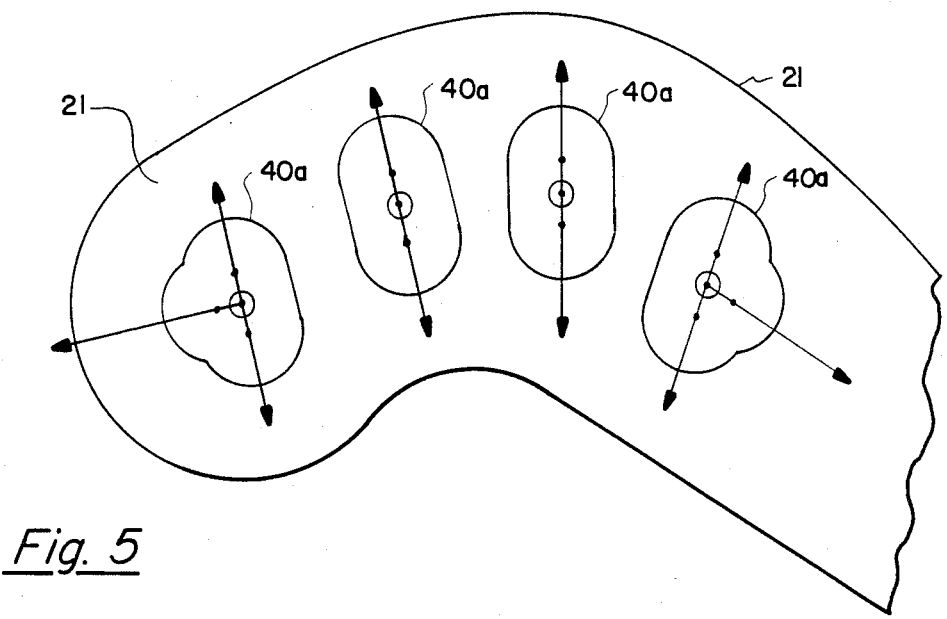
FIG. 5 is fragmentary plan view of the base of a housing shown in FIG. 1.
Figure 6:
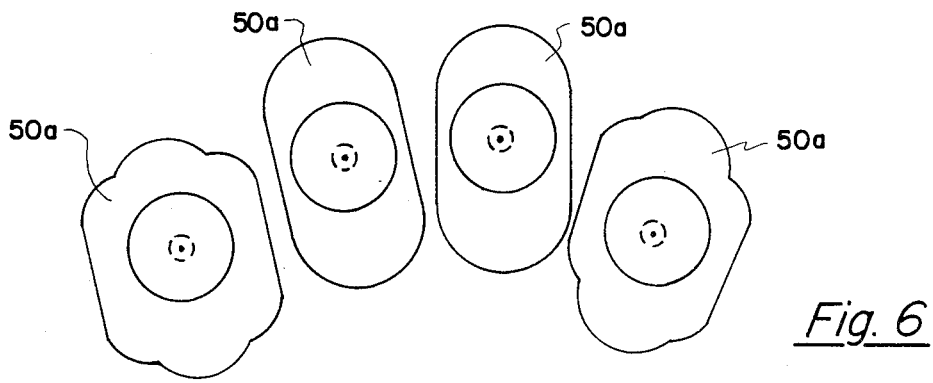
FIG. 6 is a plan view of a set of cups used in the base shown in FIG. 5.
Figure 7:
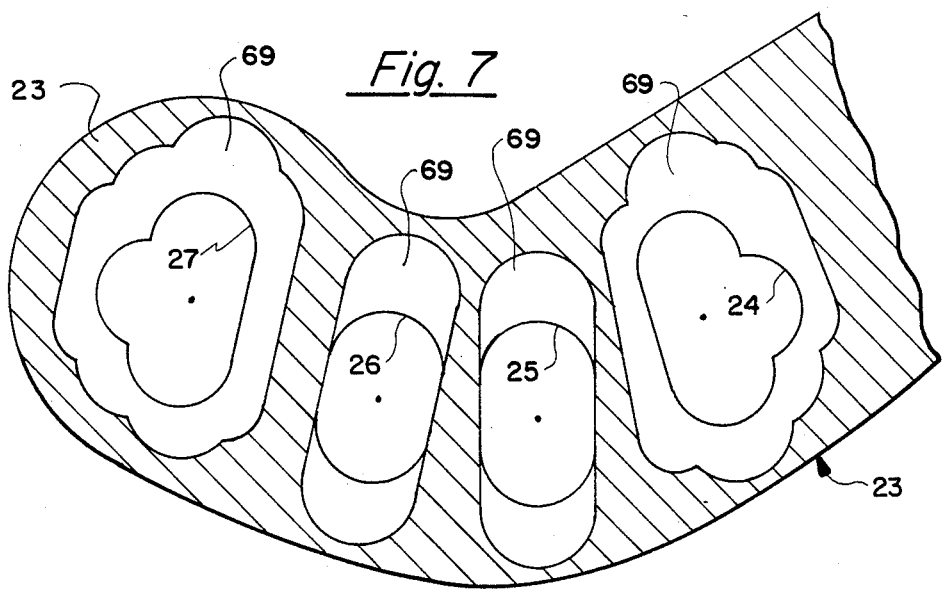
FIG. 7 is a bottom view of a cover used with the invention.

FIG. 5 shows the preferred shapes of the chambers 40a in body 21 to enable free cup movement. Since these chambers must be close together, to comport with the anatomy of a user's hand, the rims 50a a of the several cups must be of restricted area, as suggested in FIG. 6. If desired, the under surface of cap 23 may be provided with concavities 69, of parti-spherical surface, to engage the spherical rim surfaces, as suggessted in FIG. 7.

Figure 8:
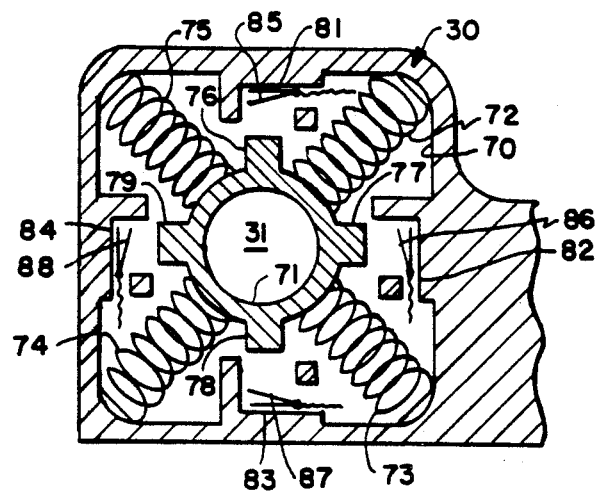
FIG. 8 is a fragmentary sectional view of a component of the invention taken perpendicularly to the axis of a thumb hole therein.

As shown in FIG. 8, housing means 30 is formed with a further chamber 70 accessible from thumb hole 32 and resiliently mounting a "cup" 71 to captivate the operator's right thumb. Cup 71 is resiliently mounted in housing means 30 on a plurality of compression springs 72, 73, 74, and 75 for resilient centering with respect to the cup axis, and is provided with a plurality of outward projections 76, 77, 78, and 79 equally spaced about the axis. Housing means 30 is provided with sockets 81, 82, 83, and 84 aligned with the cup projections, and in these sockets are mounted further electrical switches 85, 86, 87, and 88, all respectively, which are also connected to wires of cable 13.

Figure 9:
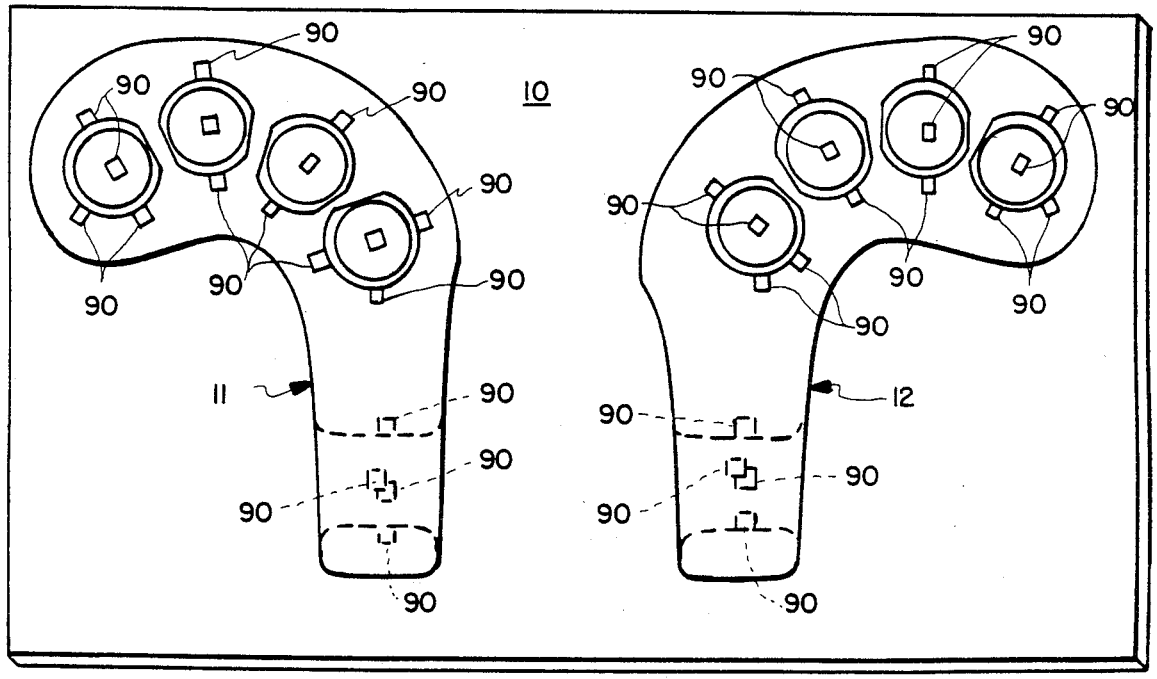
FIG. 9 is a somewhat schematic plan view showing the locations of all the various switches in the inventive structure.

A similar arrangement is provided at thumb hole 21 of housing 20. By this means eight further switch operations are made available to the operator, giving a total of 36, as suggested by the small squares in FIG. 9. Note that in this embodiment the mechanical arrangement everywhere is such that it is not possible for any operator's digit in any cup to operate more than one switch at a time.

OPERATION OF THE INVENTION

The operation of the system is almost self-evident. The operator's hands are positioned with the thumbs in the cups of the thumb holes, and with the fingers inserted in the cups of the finger holes. The operator has learned which digital movements result in which inputs, and accordingly moves the appropriate digits laterally or axially, to accomplish the desired results. This can be made an entirely learned procedure, if desired, by omitting from the housings any display of what symbols are available by operation of the various digits, so that no visual observation of the "keyboard" is possible, and the operators attention may remain entirely on the material to be entered.

Many ways of setting up the system are possible: one is suggested in the following tables. Six conditions of operation are established arbitrarily, by the operators thumb manipulations, and in each condition the finger motions produce individual inputs as shown in Tables I to III which follow:

TABLE I

| | LEFT HAND UNIT FINGER HOLES | | | | RIGHT HAND UNIT FINGER HOLES | | | |
| --- | --- | --- | --- | --- | --- | --- | --- | --- |
| | Little | Ring | Long | Index | Index | Long | Ring | Little |
| CONDITION 1 - Both thumbs at rest | | | | | | | | |
| Sideward | CR | | | q | z | | | SPACE |
| Forward | x | j | p | r | d | g | m | v |
| Downward | b | c | a | e | i | o | u | y |
| Palmward | k | w | l | t | s | h | n | f |
| CONDITION 2 - Either thumb downward | | | | | | | | |
| Sideward | | | | Q | Z | | | |
| Forward | X | J | P | R | D | G | M | V |
| Downward | B | C | A | E | I | O | U | Y |
| Palmward | K | W | L | T | S | H | N | F |

(CR = Carriage Return and Line Feed)

TABLE II

| | | | | |
| --- | --- | --- | --- | --- |
| CONDITION 3 - Right thumb palmward | | | | |
| Sideward | CLEAR | | | ENTER |
| Forward | 6 | 7 | 8 | 9 |
| Downward | 3 | 4 | 5 | . |
| Palmward | 0 | 1 | 2 | . |
| CONDITION 4 - Right thumb upward | | | | |
| Sideward | | | | |
| Forward | $ | ¢ | @ | # |
| Downward | + | − | × | ÷ |
| Palmward | = | % | − | √ |

TABLE III

| | LEFT HAND UNIT FINGER HOLES | | | | RIGHT HAND UNIT FINGER HOLES | | | |
| --- | --- | --- | --- | --- | --- | --- | --- | --- |
| | Little | Ring | Long | Index | Index | Long | Ring | Little |
| CONDITION 5 - Left thumb palmward | | | | | | | | |
| Sideward | BACK SPACE | | | | | | | |
| Forward | accent | - dash | : | ; | | | | |
| Downward | / | ! | ? | . | | | | |
| Palmward | \ | ' | " | , | | | | |
| CONDITION 6 - Left thumb upward | | | | | | | | |
| Sideward | | | | | | | | |
| Forward | } | { | & | * | | | | |
| Downward | [ | ] | ( | ) | | | | |
| Palmward | > | < | | | | | | |

From the above it will be evident that the invention comprises a ne arrangement for supplying alphanumeric and like inputs derived from the digital movements of an operator, wherein the digits are captivated and errors due to misposition of individual digits are presented.

Numerous characteristics and advantages of the invention have been set forth in the foregoing description, together with details of the structure and function of the invention, and the novel features thereof are pointed out in the appended claims. The disclosure, however, is illustrative only, and changes may be made in detail, especially in matters of shape, size, and arrangement of parts, within the principle of the invention, to the full extent indicated by the broad general meaning of the terms in which the appended claims are expressed.

The embodiments of the invention in which an exclusive property or right is claimed are defined as follows:

1. In a manual digit data input device, in combination:

a cup, having an axis, configured to captivate the distal phalanx of a manual digit;

a housing comprising a body having a cavity in which said cup is resiliently mounted and a cover having an aperture giving digital axis to said cup;

means resiliently mounting said cup in said housing for axial and mutually orthogonal transverse movements of said cups, said cup having a protruding rim and said cover having a recess engageable by said rim during transverse movements of said cup;

and electrical output devices actuated in response to movement of said cup.

2. Apparatus according to claim 1 in which said rim and said recess are of spherical configuration.

3. Apparatus according to claim 1 in which the cup has a closed bottom with an axial peg projecting outwardly therefrom;

and the housing has an aperture coaxial with said peg, so that upon axial movement of said cup said peg enters said aperture and prevents movement of said cup transverse to said axis.

4. Apparatus according to claim 4 in which the cup has a closed bottom with an axial peg projecting outwardly therefrom;

and the housing has an aperture coaxial with said peg, so that upon transverse movement of said cup said peg is displaced from said aperture and prevents axial movement of said cup.

5. Apparatus according to claim 1 in which the cup has a closed bottom with an axial peg projecting outwardly therefrom;

and the housing has an aperture coaxial with said peg, so that upon axial movement of said cup said peg enters said aperture and prevents movement of said cup transverse to said axis, and upon transverse movement of said cup said peg is displaced from said aperture and prevents axial movement of said cup.

6. In a manual digit data input device, in combination:

a cup, having an axis, configured to captivate the distal phalanx of a manual digit;

a housing;

means resiliently mounting said cup in said housing for mutually orthogonal transverse movement of said cup;

and switch means actuated in response to movement of said cup;

said cup having a closed bottom with a peg projecting outwardly therefrom;

and said housing an aperture coaxial with said peg, so that upon axial movement of said cup, said peg enters said aperture and prevents movement of said cup transverse to said axis.

7. A manual digit data input device comprising, in combination:

a first cup, having a first axis, configured to captivate the distal phalanx of a human finger;

a second cup, having a second axis generally orthogonal to said first axis, configured to captivate the distal phalanx of a human thumb;

housing means;

means resiliently mounting said first cup in said housing means for axial and mutually orthogonal transverse movements therein;

means resiliently mounting said second cup in said housing means for mutually orthogonal transverse motions therein;

and switch means in said housing means actuated in response to said movements of said cups.

8. Apparatus according to claim 7 in which said first cup has a closed end and said second cup has an open end.

* * * * *